June 28, 1960 W. R. FOWLIE ET AL 2,942,877
SHEET FEED MECHANISM FOR DUPLICATORS
Filed Oct. 3, 1956 6 Sheets-Sheet 1
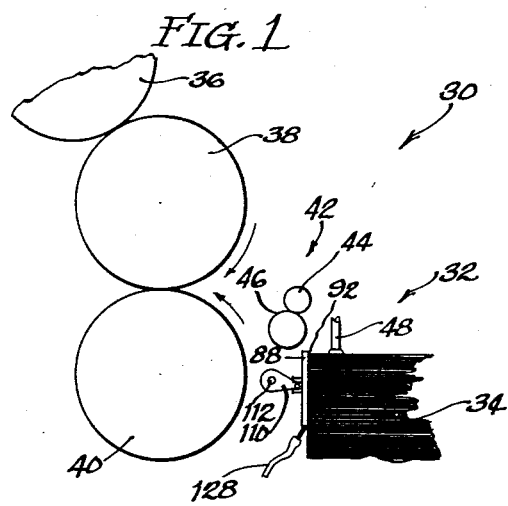
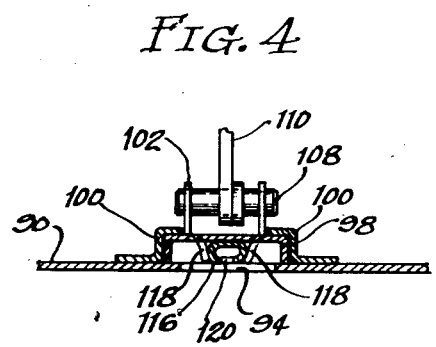
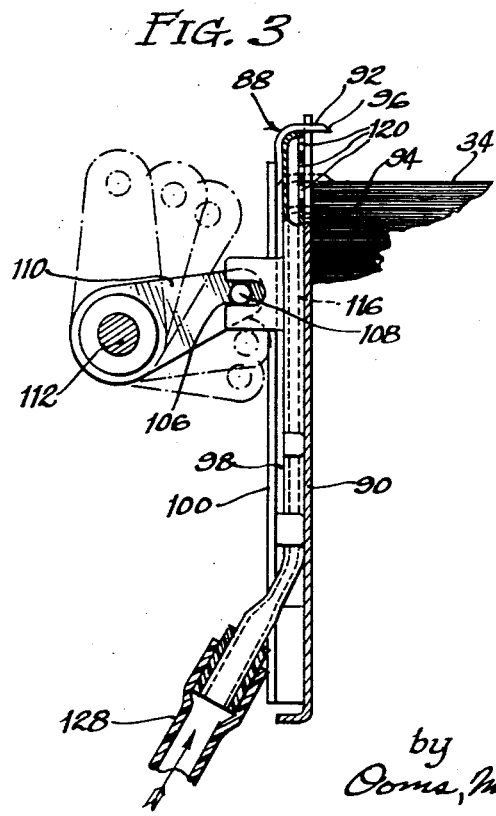
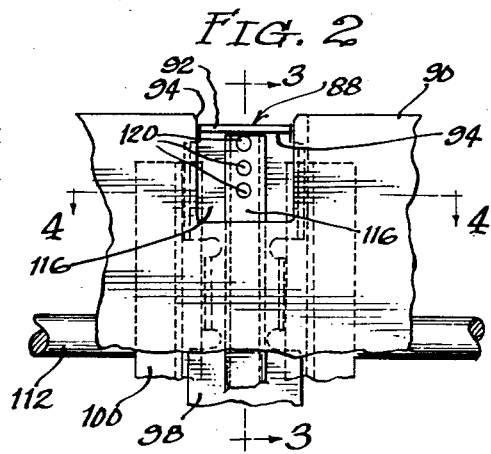
INVENTORS
Wallace R. Fowlie
John L. Tregay
Edgar H. DuBois
by Ooms, McDougall, Williams & Hersh
Attorneys

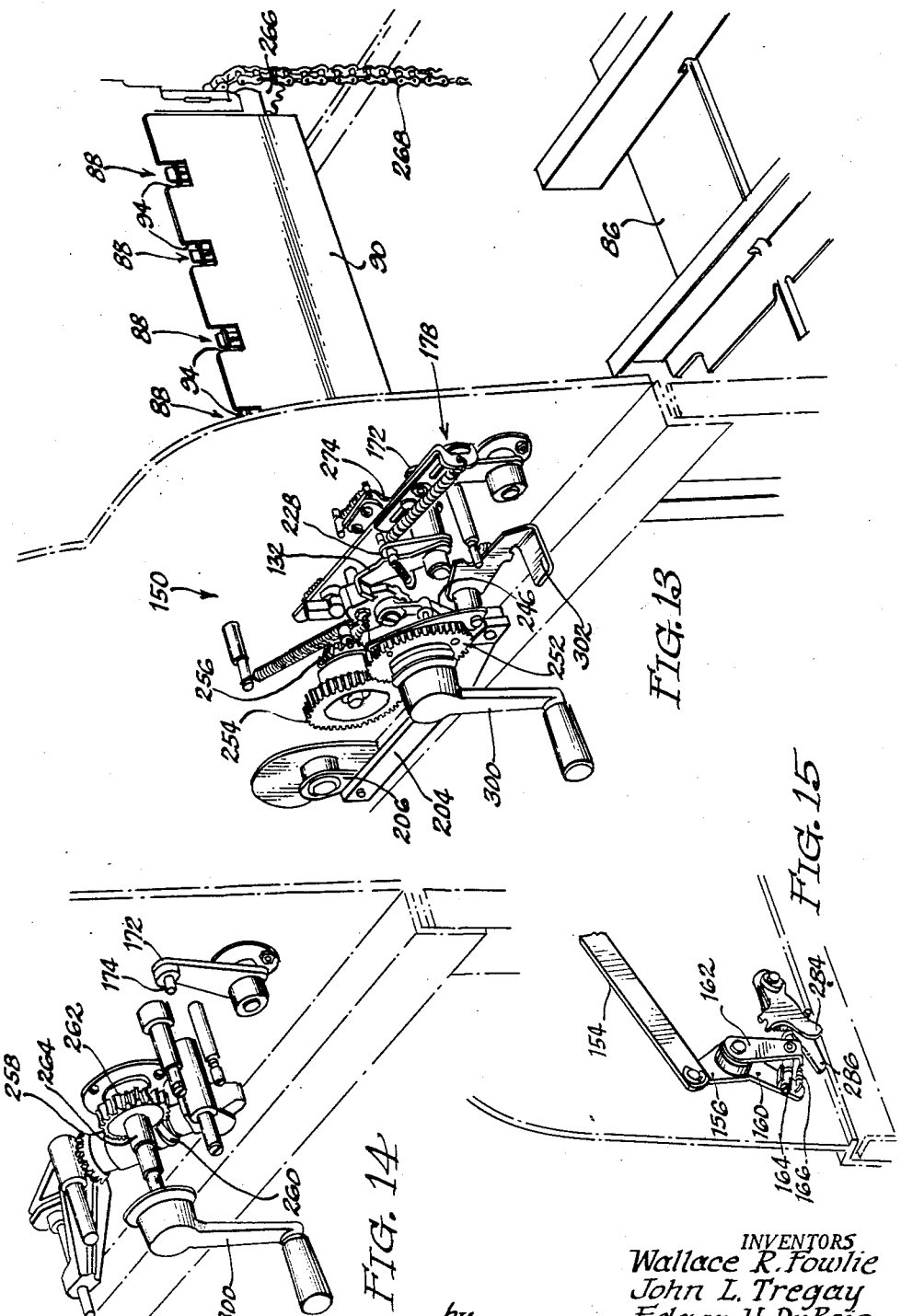

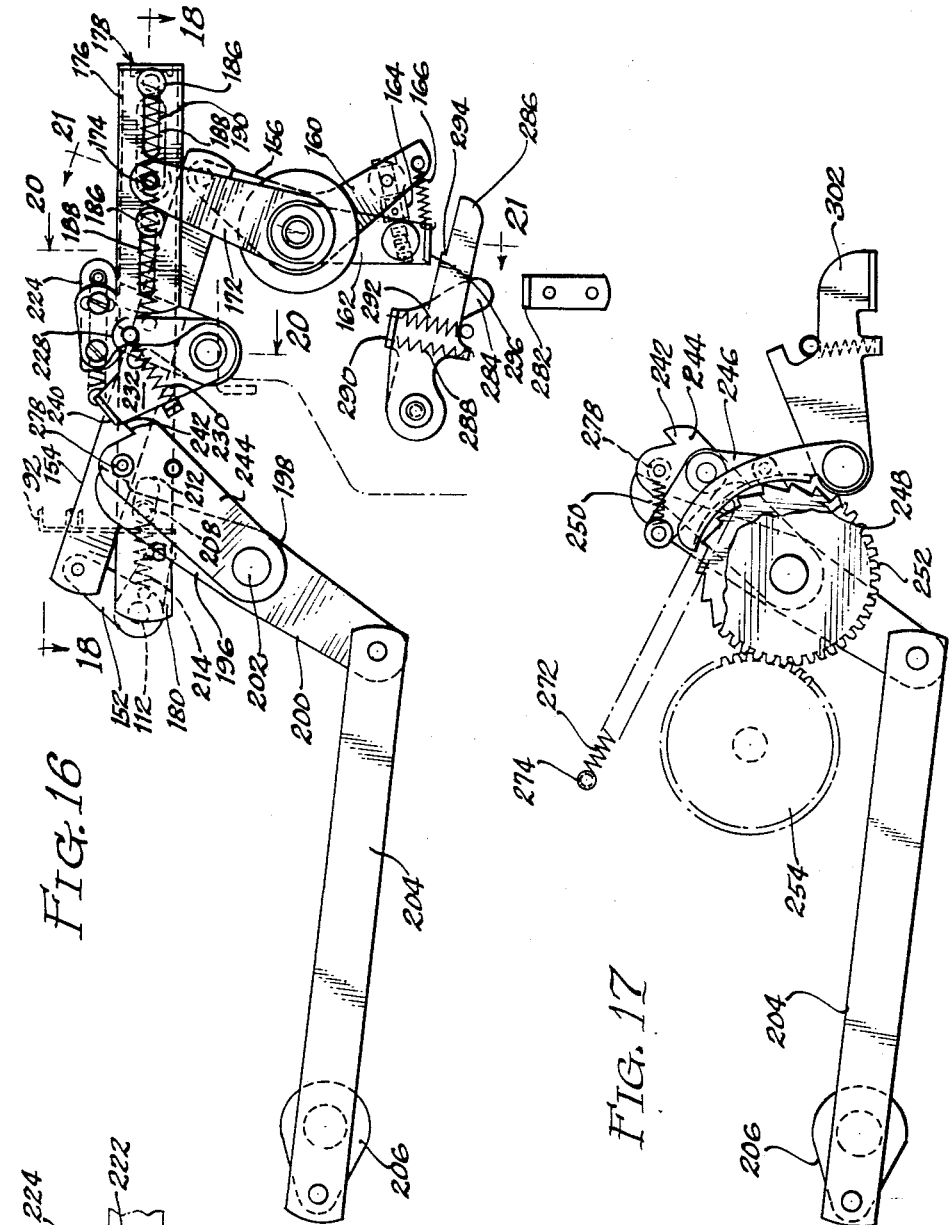

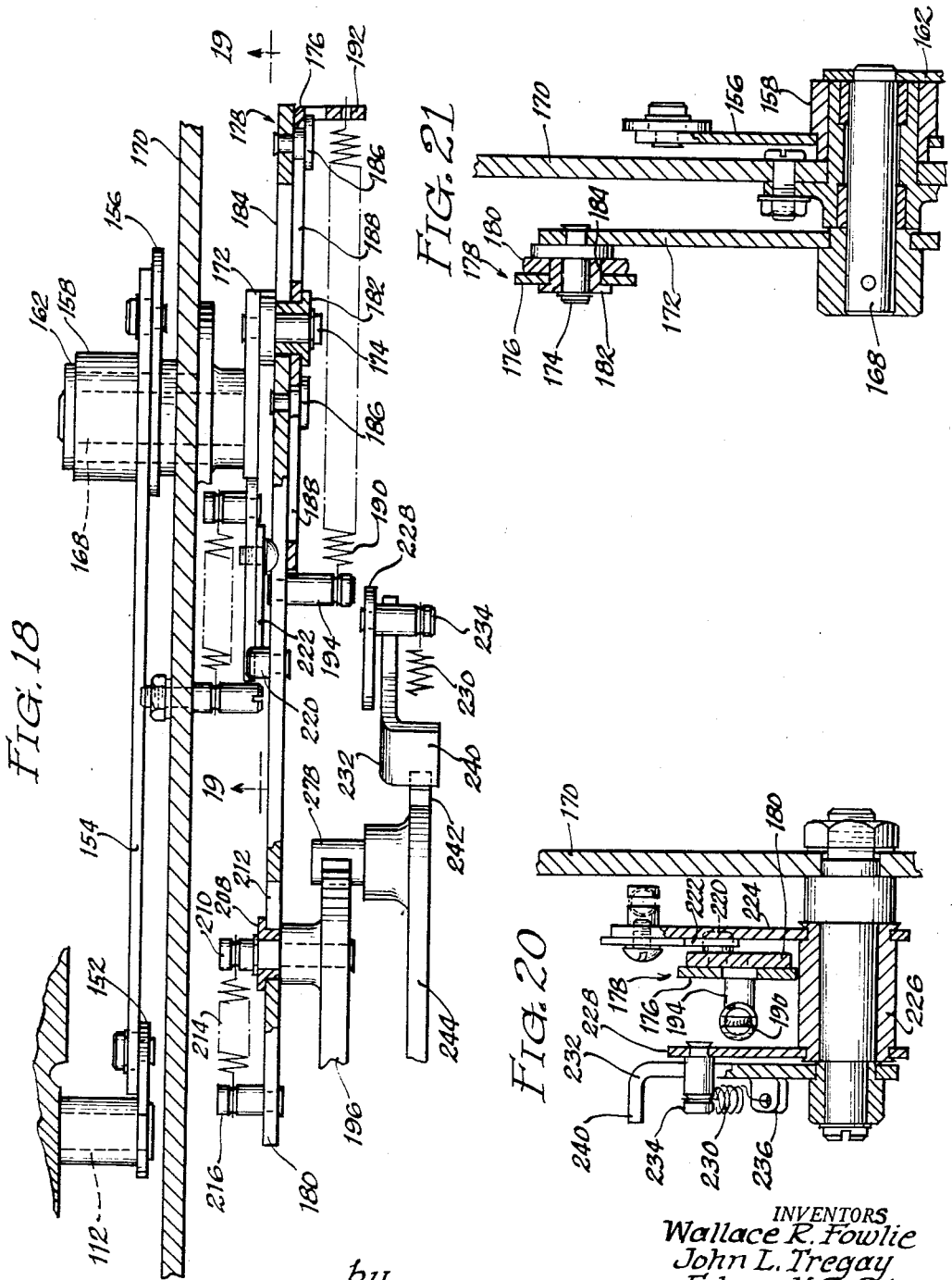

ced June 28, 1960

2,942,877
SHEET FEED MECHANISM FOR DUPLICATORS

Wallace R. Fowlie, North Riverside, John L. Tregay, Broadview, and Edgar H. DuBois, Chicago, Ill., assignors to A. B. Dick Company, Niles, Ill., a corporation of Illinois Filed Oct. 3, 1956, Ser. No. 627,530

10 Claims. (Cl. 271—31)

This invention relates to printing machines or duplicators, and pertains more particularly to sheet feed mechanisms for such machines.

One object of the present invention is to provide a new and improved sheet feed mechanism whereby sheets may be separated from the top of a paper stack in a highly effective manner.

A further object of the invention is to provide a sheet separating mechanism in which a stack of sheets is supported on a vertically movable feed table and is adapted to be engaged by combination feeling, riffling and fluffing elements which oscillate vertically so as to release the successive sheets and operate an elevating mechanism which maintains the top of the stack at a nearly constant level.

It is another object to provide a sheet separating mechanism in which the stack is fluffed by directing air against the top of the stack from air nozzles or the like which are movable vertically with the elements which feel the height of the stack and riffle the successively separated sheets.

A further object is to provide a sheet separating mechanism which is highly efficient yet is unusually simple and low in cost.

Further objects and advantages of the present invention will appear from the following description, taken with the accompanying drawings, in which:

Fig. 1 is a diagramamtic side elevational view of a three cylinder printing machine or duplicator equipped with a sheet separating mechanism which constitutes an illustrative embodiment of the present invention.

Fig. 2 is a fragmentary front elevational view of combination feeling, riffling and fluffing elements embodied in the sheet separating mechanism of Fig. 1.

Fig. 3 is a fragmentary vertical sectional view taken generally along a line 3—3 in Fig. 2.

Fig. 4 is a fragmentary horizontal sectional view taken generally along a line 4—4 in Fig. 2.

Fig. 13 is a fragmentary diagrammatic perspective view showing the combination feeling, riffling and fluffing elements, together with a mechanism which raises the feed table in response to downward movement of the feeling elements to a predetermined level, so as to maintain the top of the paper stack at a nearly constant elevation.

Fig. 14 is a perspective view similar to Fig. 13, but with certain parts removed to reveal details hidden in Fig. 13.

Fig. 15 is a fragmentary perspective view of an arrangement whereby the elevating mechanism is disabled when the table is raised to its maximum permissible height.

Fig. 16 is a side elevational view of a portion of the control mechanism which interconnects the feeler elements with the elevating mechanism.

Fig. 17 is a side elevational view showing another portion of the control mechanism.

Fig. 18 is a horizontal sectional view, taken generally along a line 18—18 in Fig. 16.

Fig. 19 is a fragmentary elevational sectional view taken generally along a line 19—19 in Fig. 18.

Fig. 20 is a fragmentary elevational sectional view taken generally along a line 20—20 in Fig. 16.

Fig. 21 is a fragmentary elevational sectional view taken generally along a line 21—21 in Fig. 16.

Figure 5:
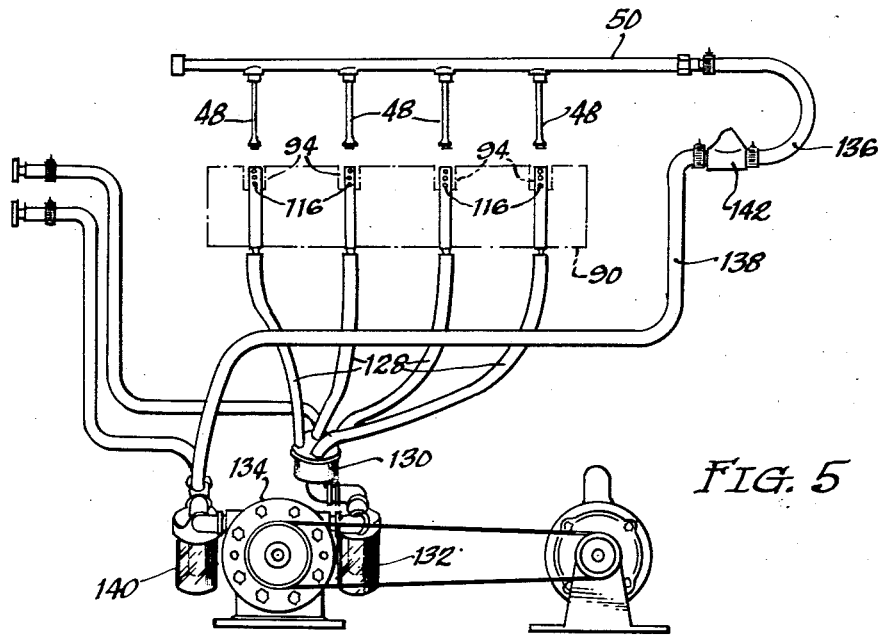
Fig. 5 is a diagrammatic view showing the manner in which air is supplied to the fluffing elements of Figs. 1 and 2, and in which vacuum is provided to operate suckers adapted to take the top sheet from the stack.

As already indicated, Fig. 1 illustrates a printing machine or duplicator 30 which is equipped with a sheet feed mechanism 32 constructed in accordance with the present invention. The purpose of the sheet feed mechanism 32 is to separate successive sheets from the top of a paper stack 34 and advance the sheets to the printing elements of the duplicator 30.

The illustrated printing machine or duplicator 30 is of the three cylinder offset lithographic type, and thus comprises a master cylinder 36, a blanket or offset cylinder 38, and an impression cylinder 40. However, it will be understood that the invention is applicable to all types of printing machines and duplicators. In the illustrated machine, the master cylinder 36 is adapted to hold a lithographic printing plate or sheet on which an ink image is formed. The ink image is transferred to the blanket cylinder 38 and then is again transferred to a sheet of paper fed between the blanket and impression cylinders 38 and 40.

In the illustrated machine 30, a forwarding mechanism 42 is employed to receive the sheets from the sheet feed mechanism 32 and advance the sheets to the blanket and impression cylinders 38 and 40. As shown, the forwarding mechanism 42 comprises a pair of engaged forwarding rollers 44 and 46. However, it will be realized that any type of forwarding mechanism may be employed. In fact, the forwarding mechanism may be dispensed with in some cases.

Figure 6:
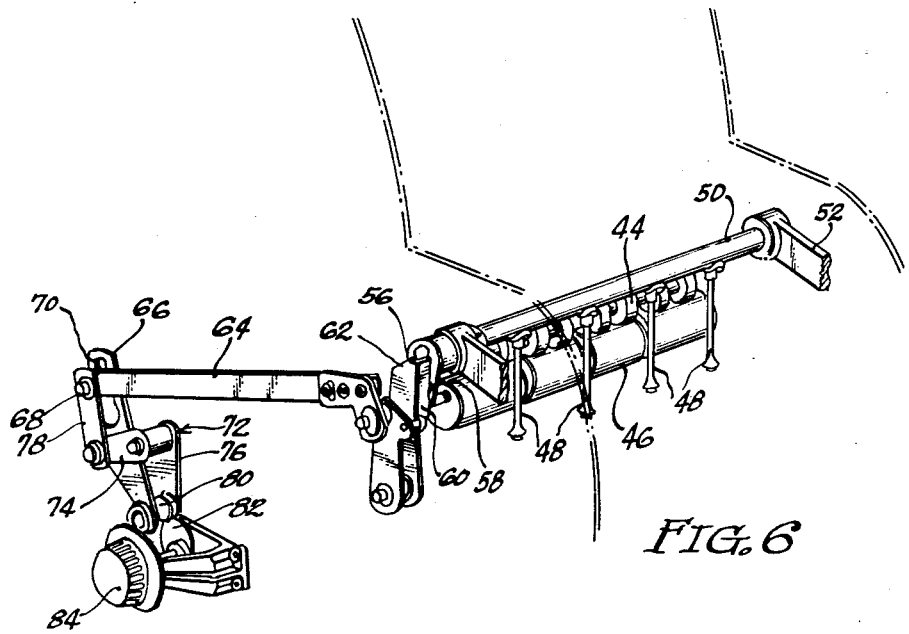
Fig. 6 is a fragentary diagrammatic perspective view showing the suckers and a portion of the forwarding mechanism which takes the sheets from the suckers.

The sheet feed mechanism 32 is provided with means for taking the top sheet from the paper stack 34. In the illustrated mechanism 32, such means comprise one or more suckers or suction nozzles 48, four such suckers being shown in Fig. 6. The detailed arrangement of the suckers 48 may be varied within the scope of the present invention. However, it will be seen that the illustrated suckers 48 are mounted in depending fashion from a horizontal suction pipe 50 (Figs 5–12). In order that the suckers 48 may be swung forwardly, the pipe 50 is pivotally connected to the outer or rear ends of a pair of arms 52, which themselves are swingable vertically about pivots 54. The swinging movement of the arms 52 is effective to move the suckers toward and away from the top of the paper stack. Any conventional or suitable mechanism may be employed to operate the suckers 48 so that they will be lowered into engagement with the paper stack so as to pick up the top sheet, raised so as to lift the top sheet, swung forwardly to present the sheet to the forwarding mechanism 42, and then return to their initial position. These successive positions of the suckers are shown in Figs. 7, 8, 10, 11 and 12. Mechanisms for operating the suckers are well known to those skilled in the art, and need not be described in detail herein. It will be understood that the suckers 48 are raised and lowered by swinging the arms 52 about their pivots 54. The suckers 48 are swung forwardly and rearwardly by rotating the suction pipe 50 with respect to the arms 52. A portion of the mechanism for swinging the suckers 48 forwardly and rearwardly is shown in Fig. 6. It will be seen that the suction pipe 50 is provided with an arm 56 which carries a roller 58, adapted to ride along a flange 60 as the suckers 48 are moved vertically. The flange 60 is formed on a lever assembly 62 which is adapted to be rocked forwardly and rearwardly by a link 64 extending to a cam follower lever 66. It will be seen that the link 64 is connected to the lever 66 by a pin 68 which extends through a longitudinal slot 70 in the cam follower lever 66. The position of the pin 68 in the slot 70 may be adjusted to change the stroke of the suckers 48. The adjustment is effected by a lever 72 having two arms 74 and 76. A short link 78 extends between the arm 74 and the pin 68. The arm 76 carries a roller or pin 80 which is engaged by a cam 82 adapted to be rotated by a knob 84. Thus, rotating the knob 84 changes the position of the lever 72 and thus shifts the pin 68 along the slot 70.

The illustrated sheet-separating mechanism 32 is provided with a vertically movable feed table 86 (Fig. 13) adapted to support the paper stack 34. The table 86 is adapted to be raised automatically, in a manner to be described in detail shortly, so as to maintain the top of the paper stack 34 at a nearly constant level.

The sheet-separating mechanism 32 is provided with means for feeling the height of the stack 34, riffling the paper sheets as they are taken from the stack, and fluffing the top portion of the stack adjacent the suckers 48 so as to prevent the suckers from taking more than one sheet from the stack. In the present embodiment, the feeling, riffling and fluffing means are combined in one or more combination elements 88, four such combination feeling, riffling and fluffing elements being shown in Figs. 5 and 13. It will be seen from Figs. 1 and 3 that the combination elements 88 are disposed adjacent the front end of the stack 34, as are the suckers 48. Thus, the suckers 48 and the combination elements 88 act cooperatively upon the front end of the stack so as to separate the sheets from the stack in a highly efficient manner.

In the illustrated feed mechanism 32, a vertical plate 90 or the like is provided adjacent the front end of the feed table 86 so as to form a stop for the front end of the stack 34. Thus, the stack 34 may be placed on the feed table 86 with the front edges of the sheets in sliding engagement with the stop plate 90.

The illustrated combination feeling, riffling and fluffing elements 88 are provided with generally horizontal fingers or blades 92 which project rearwardly over the feed table 86 and are engageable with the top of the paper stack 34. In this case, the blades 92 extend through slots or openings 94 in the stop plate 90. Each of the blades 92 terminates in a fairly sharp chisel edge 96 which acts to riffle the sheets, as will be described in detail shortly.

The combination elements 88 are movable vertically so that the blades 92 may be moved into and out of engagement with the top of the paper stock 34. In this case, the blade 92 is bent forwardly from a channel shaped sheet-metal bar 98 (Fig. 4) which is slidable vertically in guides 100 secured to the rear side of the stop plate 90. To provide for operation of the combination elements 88, a pair of lugs 102 are arranged to project rearwardly from the bar 98. It will be seen that the lugs 102 are formed with horizontal slots 106 adapted to receive a pin 108 which is carried on the outer end of an arm 110. A shaft 112 is secured to the arm 110 and is adapted to be rocked, in a manner to be described in detail shortly, so as to oscillate the bar 98 along the vertical guides 100. Each of the combination elements 88 has an individual operating arm 110 mounted on the shaft 112.

In addition to the combination feeler and riffler blade 92, each combination element 88 is provided with fluffing means now to be described. Thus, a vertical air conduit or tube 116 extends along the channel shaped bar 98 and is secured to the bar for vertical movement therewith. In the illustrated construction, the conduit 116 is retained by lugs 118 (Fig. 4). One or more orifices or nozzle openings 120 are provided in the air conduit 116 and are aimed rearwardly through the openings 94 and over the feed table 86 so as to direct air against the front end of the paper stack 34 adjacent the top thereof. The orifices 120 are located immediately under the combination feeler and riffler blade 92. In the illustrated construction, three vertically distributed orifices 120 are provided, but the exact arrangement of the orifices may be varied.

The air conduits 116 are provided with air under pressure, by means now to be described, so that the orifices 120 will direct streams of air into the front portion of the stack, immediately under the suckers 48. The air streams have the effect of fluffing up the front portion of the stack so as to provide layers or pockets of air between the individuals sheets. In this way, the air will be assured of access to the under side of the top sheet when it is engaged and picked up by the suckers 48. Thus, the suckers are prevented from picking up more than one sheet. The air conduits 116 and the orifices 120 move vertically with the vertically oscillating blades 92. In this way, the air streams from the orifices 120 are moved across the edges of the paper sheets so that air will be sure to permeate the spaces between all of the sheets adjacent the top of the stack.

Compressed air is supplied to the air conduits 116 by means of hoses 128 connected to a manifold 130, which in turn is connected through an air filter 132 to the discharge side of a motor driven pump 134. It will be seen that the pump 134 is also used to provide vacuum for operating the suckers 48. Thus, the vacuum pipe 50 is connected to the suction side of the pump 134 by means of hoses 136 and 138 and an air filter 140. A vacuum-breaker valve 142 is interposeed between the two hoses 136 and 138 to control the application of vacuum to the suckers 48. The arrangement of such vacuum-breaker valves is well known and need not be described in detail herein.

It has already been indicated that the feed table 86 is movable vertically and is adapted to be raised automatically so as to maintain the top of the paper stack 34 at a nearly constant level. The raising of the feed table 86 is controlled by the combination feeling, riffling and fluffing elements 88. Thus, the illustrated machine 30 is provided with an elevating mechanism 150 which oscillates the combination elements 88 vertically and is effective to raise the feed table 86 when the feeler blades 92 descend to a predetermined level, below the normal level of the top of the stack. The elevating mechanism 150 may be varied considerably within the scope of the present invention. However, the specific mechanism shown in the drawings will be described by way of illustration.

It has already been noted that the combination elements 88 are adapted to be moved vertically by arms 110 secured to the shaft 112. From Figs. 16 and 18, it will be seen that an upwardly extending arm 152 is secured to the shaft 112 and is pivotally connected to one end of a link 154. The other end of the link 154 is pivotally connected to an arm 156 secured to a rotatable hub 158 (Fig. 21). A second arm 160 extends downwardly from the hub 158 and is connected to still another arm 162 by an adjustable turnbuckle 164 which is loaded by a spring 166 tensioned between the arms 160 and 162.

From Fig. 21 it will be seen that the arm 162 is secured to a shaft 168 which extends through a plate 170 serving as one of the main frame members for the machine 30. A forwardly extending arm 172 is secured to the shaft 168 in front of the plate 770, the arm 162 being behind the plate.

From Fig. 16, it will be seen that a pivot pin 174 is connected between the arm 172 and the front element 176 of a two-part extensible link 178, which also has a rear part or bar 180. A bushing 182 is received around the pin 174 and is movable in a longitudinal slot 184 formed in the rear bar 180 of the extensible link 178. The link bars 176 and 180 are connected together for relative sliding movement by a pair of headed pins or rivets 186 which are secured to the rear bar 180 and are slidable along longitudinal slots 188 formed in the front bar 176. The extensible link 178 is normally contracted by a coil spring 190 tensioned between a lug 192 on the front bar 176 and a pin 194 on the rear bar 180.

The extensible link 178 is connected between the arm 172 and the upper arm 196 of a two armed lever 198, which also has a lower arm 200. The lever 198 is rockable about a pivot 202. It will be seen from Fig. 16 that a link 204 is connected between the lower lever arm 200 and a crank 206 which is rotated at constant speed by the driving mechanism (not shown) which also serves to rotate the printing cylinders 36, 38 and 40 and to operate the forwarding mechanism 42 and the suckers 48. The rotation of the crank 206 rocks the two armed lever 198 and thereby imparts oscillatory movement to the link 178, the combination elements 88, and the various elements connected between the link 178 and the combination elements 88.

From Figs. 16 and 18, it will be seen that the connection between the lever arm 196 and the link 178 is yieldable so as to provide for lost motion between these components. Thus, a bushing 208 is received on a pin 210 secured to the lever arm 196 and is slidable in a slot 212 formed in the rear bar 180 of the extensible link 178. A coil spring 214 is tensioned between the pin 210 and a pin 216 secured to the link bar 180. The spring 214 extends to the left from the pin 210 and thus tends to pull the link 178 to the right.

When the lever arm 196 swings clockwise, the link 178 is translated to the right. The arms 172, 162, 160 and 156 are swung clockwise, and the link 154 is pulled to the right. This swings the arm 152, the shaft 112, and the arms 110 in a clockwise direction, so as to lower the feeler blades 92 on the combination elements 88. If the stack of paper is at its normal elevation, the blades 92 will engage the stack before the clockwise movement of the lever arm 196 is completed. The engagement of the blades 92 with the stack arrests the movement of the link 178, with the result that lost motion occurs between the arm 196 and the link bar 180. The bushing 208 slides along the slot 212 and the spring 214 is stretched. Thus, the extent to which the link 178 moves to the right depends upon the height of the stack. If the top of the stack is below its normal level, the link 178 moves to a greater extent to the right. This additional movement is utilized to control the elevating mechanism 150 so as to raise the stack, in a manner now to be described.

When the link 178 moves to the right beyond its normal limit, a pin 220 (Figs. 18 and 19), on the rear side of the link bar 180, engages an adjustable finger or lug 222 on a lever arm 224. It will be seen from Fig. 20 that the arm 224 is secured to a rotatable hub 226 which also carries an upwardly extending arm 228, disposed in front of the extensible link 178. A spring 230 is tensioned between the arm 228 and a latching arm 232. More specifically, the spring 230 extends between a pin 234 on the arm 228 and a lug 236 on the arm 232. The spring 230 normally holds the arm 232 against the pin 234, but is adapted to yield so that lost motion may occur between the arms 228 and 232.

The latching arm 232 has a flange 240 which normally is hooked over a tooth 242 on a pawl carrying arm 244 (Figs. 16 and 17). It will be seen that a pawl 246 is pivoted on the arm 244 and is engageable with a ratchet wheel 248. A spring 250 biases the pawl 246 against the ratchet wheel 248. Rotation of the ratchet wheel 248 is effective to raise the feed table 86. Thus, it will be seen from Figs. 13 and 14 that the ratchet wheel is secured to a gear 252 which meshes with another gear 254. A bevel gear 256 is secured to the gear 254 and is arranged to mesh with another bevel gear 258. A worm 260 is connected to the bevel gear 258 and is in mesh with a worm wheel 262. A shaft 264 extends between the worm wheel and a pair of sprockets 266, only one of which is visible in Fig. 13. Chains 268 extend over the sprockets 266 and are connected to the feed table 86. Thus, rotation of the worm wheel 262 is effective to raise the table 86.

Normally, the pawl carrying arm 244 is latched against counterclockwise movement by the latching arm 232. A coil spring 272 is tensioned between the arm 244 and a fixed anchor 274 and is so arranged as to tend to swing the arm 244 in a counterclockwise direction. When the link 178 moves an extra amount to the right, due to extra downward movement of the feeler blades 92, the latching arm 232 is pulled away from the tooth 242 on the arm 244. Thus, the arm 244 is released so that it may be swung counterclockwise by the spring 272.

The pawl carrying arm 244 is provided with a pin or roller 278 which is engageable with the upper lever arm 196. As the lever arm 196 is swung counterclockwise by the crank 206, the arm 244 follows the arm 196 clockwise, provided that the latch 232 has been released. On the clockwise stroke of the two-armed lever 198, the arm 196 swings the arm 244 positively in a clockwise direction. As a result, the pawl 244 advances the ratchet wheel 248 and raises the table 86 by a small, predetermined amount. The raising of the paper stack decreases the extent to which the link 178 travels to the right and thereby tends to permit resetting of the latch 232.

At the end of each clockwise stroke of the two-armed lever 198, the arm 196 engages the pin 278 and swings the arm 244 a small amount clockwise beyond its latched position, so as to release the latching pressure between the latch arm 232 and the tooth 242. In this way, the release of the latch 232 is facilitated.

When the table 86 is raised to the maximum permissible extent, the elevating mechanism 150 is automatically disabled. Thus, the table 86 carries a flange or bracket 282 which engages a swingable arm 284 as the table approaches its upper limit of travel. The arm 284 is yieldably connected to a latching arm 286 by means of a tension spring 288, which normally holds the arm 286 against a flange 290 on the arm 288. A second tension spring 292 biases the arm 284 downwardly. The bracket 282 raises the arms 284 and 286 until a latching shoulder 294, on the arm 286, is moved into the path of a flange 296 on the arm 162. Thus, the arm 286 latches the arm 162 against clockwise movement and prevents full lowering of the feeler blades 92. The latching action also prevents full movement of the link 178 to the right and thereby disables the elevating mechanism 150.

When the two-armed lever 198 is swung counterclockwise, the feeler blades 92 are raised. However, the blades 92 become fully raised before the lever 198 completes its counterclockwise stroke. During the remaining portion of the stroke, the link 178 is extended against the resistance of the spring 190. In other words, the rear link bar 180 slides to the left relative to the front link bar 176, which remains stationary. Thus, the extensible link 178 permits the lever 198 to be swung by a greater amount than the arm 172.

In the operation of the paper feed mechanism 32, the paper stack 34 is placed on the feed table 86 and the level of the feed table is adjusted to bring the top of the stack approximately to its normal level. To provide for such manual adjustment, a crank 300 is movable into engagement with the gear 252. The table 86 may be raised by turning the crank 300 clockwise. A hand lever 302 is also provided to release the pawl 246 from the ratchet wheel 248 so that the crank 300 may be turned counterclockwise to lower the table 86.

Figure 7:
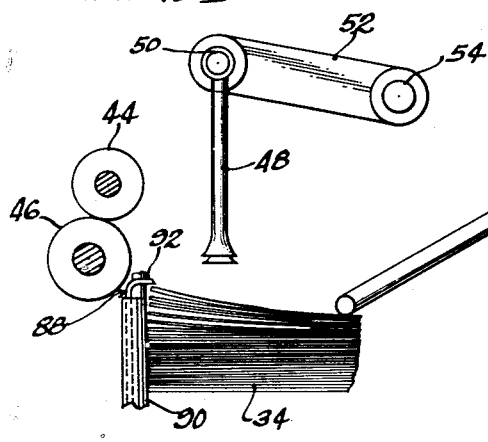
Figs. 7–12 are diagrammatic side elevational views showing successive positions of the suckers and the combination feeling, riffling and fluffing elements.

Next, the pump 134 is started to supply air to the combination fluffing, feeling and riffling devices 88, while providing vacuum for the suckers 48. The printing machine 30 may then be set into operation, whereupon the suckers 48 and the combination devices 88 will move through the sequence of positions shown in Figs. 7–12. In Fig. 7, the suckers 48 are fully raised but are fully retracted from the forwarding rollers 44 and 46. The combination feeling, riffling and fluffing devices 88 are also fully raised so that the feeler blades 92 are out of engagement with the top of the paper stack 34.

Figure 8:
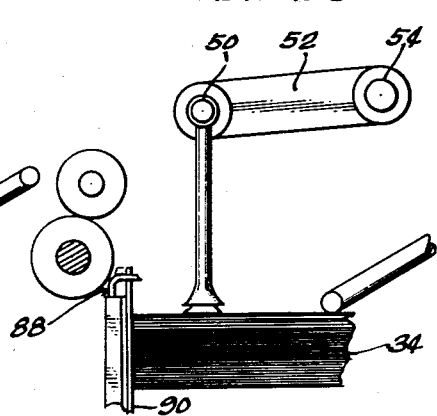

In the next step of the operation, the suckers 48 are moved downwardly toward the top of the paper stack 34, as shown in Fig. 8. During this downward movement of the suckers 48, the feeler blades 92 may remain in their raised position. When the suckers 48 engage the top sheet in the stack 34, they pick up the sheet due to the vacuum provided by the pump 134.

Figure 9:
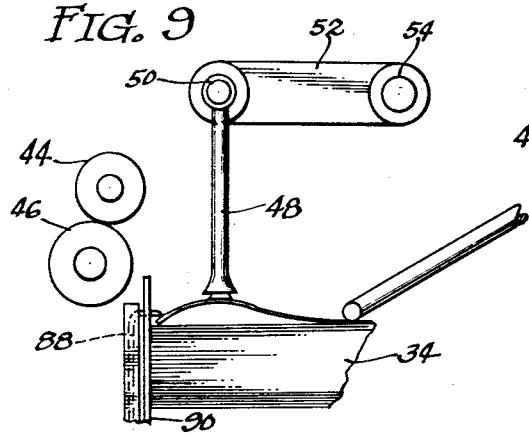

The suckers 48 then start to rise, as shown in Fig. 9, to pull the top sheet off the stack 34. While the suckers 48 are rising, the feeler or riffler blades 92 are moving downwardly. During this downward movement, the air streams from the orifices 120 play across the edges of the sheets so that the spaces between the sheets will be permeated with air. In particular, the movement of the orifices 120 assures that air will be injected under the top sheet so as to break any suction that might tend to pull the underlying sheets off the stack 34.

As the top sheet is pulled upwardly by the suckers 48, it is pulled out from under the blades 92 and is riffled across the edges 96 of the blades. The riffling edges 96 are effective to separate any underlying sheet or sheets that may be adhering to the top sheet. Thus, the movable orifices 120 and the riffling blades 92 cooperate to prevent the suckers 48 from taking more than one sheet from the stack.

After the top sheet has been separated from the stack 34, the feeler blades 92 engage the top of the stack and are arrested in their downward movement. Thus, the blades 92 feel or sense the height of the stack. If the blades 92 descend to a predetermined level below the normal elevation of the stack, the elevating mechanism 150 is activated so as to raise the table 86 and maintain the top of the stack at a nearly constant level.

Figure 10:
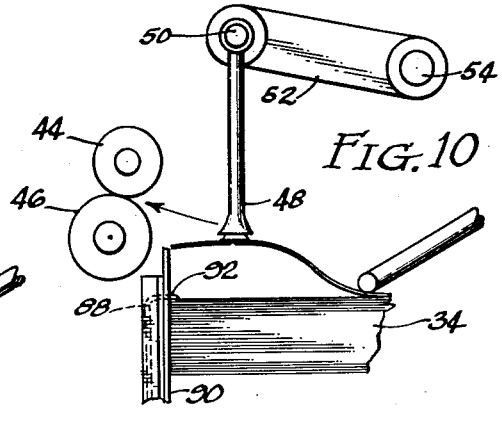
Figure 11:
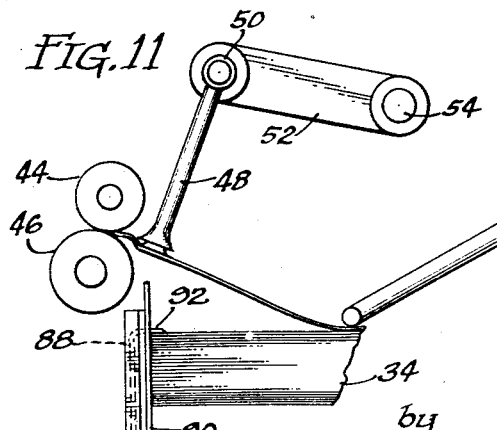
Figure 12:
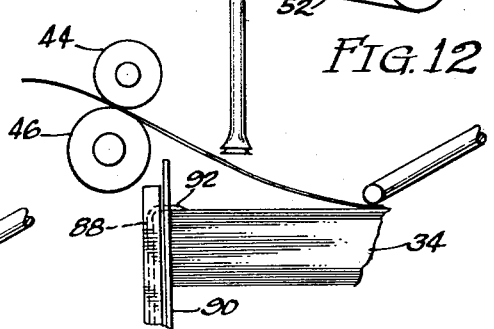

The suckers 48 take the separated sheet upwardly, as shown in Fig. 10. Then, the suckers 48 are swung forwardly so as to present the leading edge of the sheet to the forwarding rollers 44 and 46, as shown in Fig. 11. The forwarding rollers advance the sheet to the blanket and impression cylinders 38 and 40, as indicated in Fig. 12. At the same time, the suckers 48 are swung back to their original position. Finally, the feeler blades 92 are raised to their original position, as shown in Fig. 7. During the raising movement of the feeler blades 92, the air streams from the orifices are played upwardly across the edges of the sheets in the stack, so as to inject air between the sheets and fluff up or loosen the stack. This greatly facilitates the separation of the top sheet from the stack.

Various sizes of paper and card stock may be fed by the sheet feed mechanism 32. For wide stock, all four suckers and all four combination feeling, riffling and fluffing elements 88 will be employed. For narrow stock, some of the suckers 48 and some of the combination elements 88 may be out of engagement with the sheets. The idle suckers 48 need not be plugged up since the vacuum in the active suckers is sufficient to pick up the sheets, even with the idle suckers open.

The height of the feeler blades 92 may be adjusted by operating the turnbuckle 166 so as to change the angular relation between the arms 160 and 162. In this way, the normal elevation of the top of the stack may be varied to obtain best sheet separation with this type of sheets.

It will be appreciated that the sheet separating mechanism of the present invention is exceptionally effective and versatile. At the same time, it is reasonably simple in construction and low in cost. Various modifications, alternative constructions and equivalents may be employed without departing from the true spirit and scope of the invention as exemplified in the foregoing description and defined in the following claims.

We claim:

1. In a printing machine, the combination comprising a feed table for supporting a stack of paper sheets, means supporting said table for vertical movement to raise the stack, a pair of cooperatively related forwarding rollers adjacent one end of said table and above the level of the stack for receiving successive sheets therefrom, a wall extending vertically adjacent said one end of said table and providing a stop for positioning the edges of the sheets in the stack at said one end, said wall having a plurality of vertically extending openings therein opposite the top portion of the stack, a plurality of combination fluffing, riffling and feeling members behind said openings, means supporting said members for vertical movement, each of said members having a feeler blade secured thereto and extending through one of said openings and movable vertically therein into and out of engagement with the top of the stack, each of said feeler blades terminating in a sharp riffling edge, a plurality of suckers for pulling the top sheet in the stack upwardly from under said feeler blades and for riffling the top sheet across said riffling edges to separate the top sheet from the stack, means for moving said suckers to transfer the top sheet from the stack to said forwarding rollers, each of said members having a vertical air conduit secured thereon with a plurality of discharge orifices directed through the corresponding opening in said wall and against the upper edge portion of the stack under said feeler blade, means for supplying air under pressure to said conduit for discharging air jets through said orifices and thereby fluffing the upper end of the stack, means for oscillating said members vertically to move said feeler blades into and out of engagement with the top of the stack while moving said air jets across the edges of the top sheets in the stack to enhance fluffing action of said jets, and an elevating mechanism for raising said table to maintain the top of the stack at a nearly constant normal level, said elevating mechanism including control means connected to said members and responsive to lowering of said members to a predetermined extent below said normal level for activating said mechanism and elevating said table so as to raise the stack by a predetermined amount.

2. In a printing machine, the combination comprising a feed table for supporting a stack of paper sheets, a vertical stop adjacent the front end of said table for positioning the front end of the stack, said stop having an opening therein, a combination feeling and riffling member extending forwardly through said opening and over the top of the stack at the front end thereof, means for pulling the top sheet in the stack upwardly and riffling the top sheet across said feeling and riffling member, an air supply conduit on said member behind said opening and having orifice means therein for directing an air blast against the front edge of the stack adjacent the top thereof to fluff the stack, means for oscillating said member vertically to move said member into and out of engagement with the top of the stack, said conduit and orifice means being movable vertically with said member to move said air blast across the edges of the top sheets in the stack and thereby enhance the fluffing action of said blast, and means responsive to downward movement of said member to a predetermined level for elevating said table and thereby raising the stack so as to maintain the top of the stack at a nearly constant level.

3. In a printing machine, the combination comprising a vertically movable feed table for supporting a stack of paper sheets, means adjacent the front end of the table and forming a vertical stop for positioning the front end of the stack, forwarding means adjacent the front end of said table and above said stop for receiving successive sheets from the top of the stack, said stop having an opening therein, a feeler and riffler blade extending forwardly through said opening over the top of the stack and terminating in a riffling edge projecting forwardly, means supporting said blade for vertical movement, an air conduit secured to said blade behind said opening and having orifice means therein aimed forwardly for directing an air blast against the front edge of the stack adjacent the top thereof to fluff the stack, said conduit and orifice means being movable vertically with said blade to move said air blast across the edges of the top sheets in the stack and thereby enhance the fluffing action of said blast, sucker means for pulling the top sheet in the stack out from under said blade and riffling the edge of the top sheet across said blade to separate the top sheet from the stack, means for moving said sucker means to transfer the top sheet from the stack to said forwarding means, means for oscillating said blade vertically into and out of engagement with the top of the stack so that said blade will feel the height of the stack, and means responsive to downward movement of said blade to a predetermined level for elevating said table and thereby raising the stack to maintain the top of the stack at a nearly constant level.

4. In a printing machine, the combination comprising a feed table for supporting a stack of paper sheets, a combination feeling and riffling member extending over said table at one end thereof, for engaging the top of the stack, an air supply conduit on said member and having orifice means therein aimed over said table for directing an air blast against the end edge of the stack adjacent the top thereof to fluff the stack, means for oscillating said member vertically to move said member into and out of engagement with the top of the stack, said conduit and orifice means being movable vertically with said member to move said air blast across the edges of the top sheets in the stack and thereby enhance the fluffing action of said blast, and means responsive to downward movement of said member to a predetermined level for elevating said table and thereby raising the stack so as to maintain the top of the stack at a nearly constant level.

5. In a printing machine, the combination comprising a feed table for supporting a stack of paper sheets, a combination feeling and riffling member extending generally horizontally over said table at one end thereof, for engaging the top of the stack, means for taking the top sheet in the stack upwardly from under said member and riffling the top sheet across said member, an air supply conduit on said member and having orifice means therein aimed over said table for directing an air blast against the edge of the stack adjacent the top thereof to fluff the stack, means for oscillating said member vertically to move said member into and out of engagement with the top of the stack, said conduit and orifice means being movable vertically with said member to move said air blast across the edges of the top sheets in the stack and thereby enhance the fluffing action of said blast, and means responsive to downward movement of said member to a predetermined level for elevating said table and thereby raising the stack so as to maintain the top of the stack at a nearly constant level.

6. In a printing machine, the combination comprising a feed table for supporting a stack of sheets, a vertically movable member adjacent one end of said table, said member having a combination feeling and riffling finger secured thereon and extending over said end of said table for engaging the top of the stack, an air supply conduit secured on said member and having orifice means therein aimed in a generally horizontal direction over said table but under said finger for directing an air blast against the edge of the stack adjacent the top thereof to fluff the stack, and means oscillating said member up and down in a vertical direction to move said finger into and out of engagement with the top of the stack while moving said air blast vertically across the edges of the top sheets in the stack to enhance the fluffing action of said blast.

7. In a printing machine, the combination comprising a vertically movable feed table for supporting a stack of paper sheets, means adjacent one end of the table and forming a vertical stop for positioning the front end of the stack, forwarding means adjacent said end of said table and above said stop for receiving successive sheets from the top of the stack, said stop having an opening therein, a generally horizontal feeler and riffler blade extending through said opening and over said table for engaging the top of the stack, said blade terminating in a riffling edge, means supporting said blade for vertical movement, an air conduit secured to said blade behind said opening and having orifice means therein aimed over said table and under said blade for directing an air blast against the edge of the stack adjacent the top thereof to fluff the stack, said conduit and orifice means being movable vertically with said blade to move said air blast across the edges of the top sheets in the stack and thereby enhance the fluffing action of said blast, sucker means for pulling the top sheet in the stack upwardly and from under said blade and for riffling the edge of the top sheet across said blade to separate the top sheet from the stack, means for moving said sucker means to transfer the top sheet from the stack to said forwarding means, means for oscillating said blade vertically into and out of engagement with the top of the stack so that said blades will feel the height of the stack, and means responsive to downward movement of said blade to a predetermined level for elevating said table and thereby raising the stack to maintain the top of the stack at a nearly constant level.

8. In a printing machine, the combination comprising a vertically movable feed table for supporting a stack of paper sheets, a generally horizontal feeler and riffler blade extending over said table at one end thereof for engaging the top of the stack, said blade terminating in a riffling edge, means supporting said blade for generally vertical movement, an air conduit secured to said blade behind said opening and having orifice means therein aimed over said table for directing an air blast against the edge of the stack adjacent the top thereof to fluff the stack, said conduit and orifice means being movable vertically with said blade to move said air blast across the edges of the top sheets in the stack and thereby enhance the fluffing action of said blast, means for oscillating said blade vertically into and out of engagement with the top of the stack so that said blade will release the top sheet and feel the height of the stack, and means responsive to downward movement of said blade to a predetermined level for elevating said table and thereby raising the stack to maintain the top of the stack at a nearly constant level.

9. In a printing machine, the combination comprising a feed table for supporting a stack of paper sheets, means supporting said table for vertical movement to raise the stack, a plurality of combination fluffing, riffling and feeling members supported for vertical movement and having fingers secured thereto and extending over said table at one end thereof and movable into and out of engagement with the top of the stack, means for taking the top sheet off the stack and from under said fingers and for riffling the top sheet across said fingers to separate the top sheet from the stack, each of said members having an air conduit secured thereon with orifice means therein aimed over said table and under the corresponding finger for directing an air blast against the edge of the stack to fluff the stack, means for oscillating said members vertically to move said fingers into and out of engagement with the top of the stack while moving said air blast across the edges of the top sheets in the stack to enhance the fluffing action of said air blast, and elevating means connected to said members and responsive to lowering of said fingers to a predetermined level for elevating said table so as to maintain the top of the stack at a nearly constant level.

10. In a printing machine, the combination comprising a feed table for supporting a stack of paper sheets, means supporting said table for vertical movement to raise the stack, means extending vertically adjacent one end of said table and providing a stop for positioning the end of the stack, said stop having a plurality of openings therein opposite the top portion of the stack, a plurality of combination fluffing, riffling and feeling members, means supporting said members for vertical movement, each of said members having a blade secured thereto and extending through one of said openings and over said table and movable vertically therein into and out of engagement with the top of the stack, each of said blades terminating in a sharp riffling edge, means for taking the top sheet from the stack and from under said blades and for riffling the top sheet across said riffling edges to separate the top sheet from the stack, each of said members having a air conduit secured thereon with a plurality of vertically distributed discharge orifices directed through the corresponding opening in said stop and against the end of the stack under the corresponding blade, means for supplying air under pressure to said conduit for discharging air jets through said orifices and thereby fluffing the upper end of the stack, means for oscillating said members vertically to move said blades into upper and out of engagement with the top of the stack while moving said air jets across the edges of the top sheets in the stack to enhance the fluffing action of said jets, and an elevating mechanism for raising said table to maintain the top of the stack at a nearly constant normal level, said elevating mechanism including control means connected to said members and responsive to lowering of said blades to a predetermined extent below said normal level for activating said mechanism and elevating said table so as to raise the stack by a predetermined amount.

References Cited in the file of this patent

UNITED STATES PATENTS

| | | |
|---|---|---|
| 939,260 | Hren | Nov. 9, 1909 |
| 2,434,530 | Williams | Jan. 13, 1948 |
| 2,476,577 | Backhouse | July 19, 1949 |
| 2,790,637 | Waller | Apr. 30, 1957 |